United States Patent
Lipka et al.

(10) Patent No.: US 11,746,741 B2
(45) Date of Patent: Sep. 5, 2023

(54) PARTITIONED ROTOR BLADE OF A WIND TURBINE, AND ROTOR BLADE SEGMENT

(71) Applicant: Nordex Energy SE & Co. KG, Hamburg (DE)

(72) Inventors: Thomas Lipka, Rostock (DE); Andreas Nickel, Hamburg (DE); Tim Berend Block, Henstedt-Ulzburg (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 17/152,475

(22) Filed: Jan. 19, 2021

(65) Prior Publication Data

US 2021/0222668 A1    Jul. 22, 2021

(30) Foreign Application Priority Data

Jan. 22, 2020   (EP) .................................. 20153162

(51) Int. Cl.
*F03D 1/06*   (2006.01)

(52) U.S. Cl.
CPC ......... *F03D 1/0633* (2013.01); *F03D 1/0675* (2013.01); *F05B 2230/60* (2013.01); *F05B 2240/302* (2013.01); *F05B 2260/301* (2013.01)

(58) Field of Classification Search
CPC . F03D 1/0633; F03D 1/0675; F05B 2240/302
See application file for complete search history.

(56) References Cited

U.S. PATENT DOCUMENTS

| | | | |
|---|---|---|---|
| 8,777,573 B2 * | 7/2014 | Hibbard | F03D 1/0675 416/132 B |
| 9,284,948 B2 | 3/2016 | Friedrich et al. | |
| 9,759,185 B2 | 9/2017 | Bohlen | |
| 2015/0132141 A1 * | 5/2015 | Stege | F03D 1/0675 416/228 |
| 2015/0292477 A1 * | 10/2015 | Kratmann | F03D 1/0675 416/229 R |
| 2019/0338750 A1 | 11/2019 | Bech | |
| 2020/0248671 A1 | 8/2020 | Messing et al. | |

(Continued)

FOREIGN PATENT DOCUMENTS

| | | |
|---|---|---|
| EP | 2391807 A2 | 12/2011 |
| EP | 2815861 A1 | 12/2014 |
| EP | 2836702 A1 | 2/2015 |

(Continued)

*Primary Examiner* — Courtney D Heinle
*Assistant Examiner* — Sang K Kim
(74) *Attorney, Agent, or Firm* — Walter Ottesen, P.A.

(57) ABSTRACT

The invention is directed to a partitioned rotor blade for a wind turbine, which, with respect to a longitudinal axis of the rotor blade, is formed by a first rotor blade segment and a second rotor blade segment. The first rotor blade segment has at a first connection end, a first connecting region along the longitudinal axis, and the second rotor blade segment has at a second connection end, which is associated with the first connection end, a second connecting region along the longitudinal axis. The two connecting regions are connected at a partition interface of the rotor blade and form a common segmentation region. In the segmentation region, a common outer contour of the rotor blade is formed by the connection of both rotor blade segments. The outer contour is singly curved.

17 Claims, 7 Drawing Sheets

(56) References Cited

U.S. PATENT DOCUMENTS

2022/0065218 A1* 3/2022 Huth .................... F03D 1/0633

FOREIGN PATENT DOCUMENTS

| FR | 1187166 A | 9/1959 | | |
|----|-----------|--------|---|---|
| WO | 2013075718 A1 | 5/2013 | | |
| WO | 2018121826 A1 | 7/2018 | | |
| WO | 2019081510 A1 | 5/2019 | | |
| WO | 2019219139 A1 | 11/2019 | | |
| WO | WO-2021063495 A1 * | 4/2021 | ........... | F03D 1/0675 |

* cited by examiner

A - A

PARTITIONED ROTOR BLADE OF A WIND TURBINE, AND ROTOR BLADE SEGMENT

CROSS REFERENCE TO RELATED APPLICATION

This application claims priority of European patent application no. 20153162.1, filed Jan. 22, 2020, the entire content of which is incorporated herein by reference.

FIELD OF THE INVENTION

The present invention relates to a partitioned rotor blade for a wind turbine. The invention furthermore relates to a rotor blade segment.

BACKGROUND OF THE INVENTION

Modern wind turbines are formed from a plurality of rotor blades, typically three rotor blades, which may for example each have a weight of up to 35 tonnes and a length of up to 90 meters.

In order to facilitate the transport of such large rotor blades, it is provided that the rotor blades consist of two or more rotor blade segments, which are mounted at the erection site of the wind turbine. Such rotor blades are also referred to as segmented or partitioned rotor blades. The rotor blade segments are typically connected to one another at partition locations during the mounting of the rotor blade. However, such connections can lead to the rotor blade being structurally weakened in the segmentation regions, with the result that structural reinforcement of the rotor blade is required in the regions.

During operation, the connections of the rotor blade segments are subjected to flexural and centrifugal loading due to the rotation of the rotor blade. Accordingly, the connections must be configured in such a way that they withstand the shear and normal stresses induced by this type of loading. Both types of stress in the connections are dependent on a thickness of the rotor blade cross section, such that an increase in the thickness reduces the stress that arises, for example, from a bending moment.

From an aerodynamic aspect, it is however particularly normally preferable for the thickness of the rotor blades to be minimized. Accordingly, a person skilled in the art is confronted with two conflicting problems: the increase in the thickness improves the strength of the rotor blade but is undesired from an aerodynamic aspect, and the reduction in the thickness is desirable from an aerodynamic aspect but reduces the strength of the connection.

SUMMARY OF THE INVENTION

An object on which the present invention is based is to provide a concept for a partitioned rotor blade that makes possible on the one hand particularly high strength and on the other hand good aerodynamic properties in a segmentation region of the partitioned rotor blade.

According to a first aspect, a partitioned rotor blade for a wind turbine, which, with respect to a longitudinal axis of the rotor blade, is formed by at least one first rotor blade segment and one second rotor blade segment, is disclosed. The first rotor blade segment has at a first connection end a first connecting region, in particular along the longitudinal axis, and the second rotor blade segment has at a second connection end, which is associated with the first connection end, a second connecting region, in particular along the longitudinal axis. The two connecting regions are connected at a partition location of the rotor blade and form a common segmentation region. In the segmentation region of the rotor blade, a common outer contour of the rotor blade, which common outer contour is formed by the connection of both rotor blade segments, is singly curved.

The wind turbine rotor blade described is formed by two rotor blade segments connected at the partition location. According to the invention, it is provided that, in the region of the partition location, the segmentation region, the outer contour of the rotor blade, which is also referred to as an aerodynamic envelope and/or is formed by the outer surface of the rotor blade shell, has a single curvature. This means that there is only one curvature in one dimension, in particular transverse to the longitudinal axis of the rotor blade. In a further dimension, for example with respect to the longitudinal axis, there is substantially (that is, within the scope of manufacturing tolerances) no curvature, that is, a curvature value is 0. The invention consequently provides a particularly optimized shape of envelope or contour for segmented rotor blades, which transitions from a doubly curved contour into a singly curved contour in the segmentation region.

The segmentation region, for example for aerodynamic profiles with a thin trailing edge, as are preferably used in the outer blade half, extends, as seen in the blade depth direction from the leading edge, in a region between 10 and 70 percent of the blade depth. For profiles with a thick trailing edge, in particular so-called flatback profiles, as are preferably used in the inner blade half, the segmentation region preferably extends over almost the entire profile depth and in particular up to the point directly at the thick trailing edge, so that here between 5 and up to 100% of the profile depth is conceivable. The segmentation region comprises for example the region of the rotor blade, or of the rotor blade segments, in which the structural elements for connection of the rotor blade segments are accommodated. In the region of the leading edge and the trailing edge, the rotor blade may have a doubly curved shape, owing to a particular configuration which is due, for example, to aerodynamics. The extension of the segmentation region is between 10 and 70 percent.

The solution according to the invention makes it possible to achieve, in the segmentation region, a particularly high degree of strength in terms of structural mechanics in combination with particularly favorable aerodynamic properties. It is consequently possible, in particular in an optimum manner in terms of structural space, for a particularly large number of connection elements, such as bearing sleeves, to be introduced in the segmentation region and used for the connection of the segments. A major advantage lies in the fact that, with the proposed change to the aerodynamic envelope, it is possible for the connection elements to be embedded into the rotor blade shell, which forms the aerodynamic envelope, without a large spar shaft, loss of structural space or complicated supporting of the bearing or threaded sleeves. In this way, the optimum number of bearing sleeves, the optimum position of the bearing sleeves and the optimum attachment of the main spar cap to these bearing sleeves are made possible.

An aerodynamic envelope of an unpartitioned rotor blade is typically optimized aerodynamically and in terms of structural mechanics for the maximum yield from wind energy. This means that, with the exception of the blade connection, which is circular for structural mechanics-related reasons, it is doubly curved, has a pre-bending along its longitudinal axis and has aerodynamic profiles which are threaded and twisted in relation to one another along the longitudinal axis.

The inventors have recognized that a typically doubly curved outer contour of the rotor blade that is twisted in the profile cross sections and freely shaped is, in combination with a pre-bending, problematic for the connection of the segments, particularly in the case of partitionings close to the tip of the rotor blade. In particular, an installation or leveling of straight connection assemblies would be made very difficult and would result in a loss of installation space. The typically used straight longitudinal bolt connections by means of bearing sleeves would in this case have to be fastened in the interior of the envelope of the rotor blade, which envelope is curved in all spatial directions. For an unchanged aerodynamic envelope or rotor blade shell, this would lead to an enormous loss of structural space for the connection elements and thus to an implementation which is highly unfavorable in terms of configuration and structural mechanics. The solution according to the invention makes it possible for problems of the type to be avoided or at least mitigated.

The two segments are in particular connected in a flush manner, with the result that, at least with respect to the outer contour, the cross-sectional profiles at the partition location transition into one another seamlessly. As a result of the connection of the segments, a gap may be present at the partition location. In other words, the partitioning is not intended to result in an abrupt change of the aerodynamic profile, that is, the outer contour.

It should be pointed out at this juncture that rotor blades are typically manufactured from half-shells which are connected to one another at edges extending in the direction of the longitudinal axis. For the production of the half-shells, use is made of molds into which there is placed a laminate structure which is impregnated with resin by means of a vacuum infusion process and which is subsequently cured. The molds predefine the outer contour of the half-shells or of the rotor blade. The outer contour is decisive for the structural and aerodynamic properties of the rotor blade, in particular with regard to the presently described optimized connection in the region of the partition location.

The wind turbine rotor blade is partitioned into at least two rotor blade segments. Two or more partition locations are also conceivable, with the further segments being able to be mechanically coupled analogously to the connection system described.

In the context of the present disclosure, the following definitions apply:

The expression "profile depth" (or "chord") defines the spacing from the leading edge to the trailing edge of a rotor blade profile, that is, from the profile leading edge to the profile trailing edge, at any point along the longitudinal axis. In the present invention, dimensions in this direction can be described as larger or smaller.

Furthermore, the expression "profile thickness" (or "profile height") defines the maximum spacing between the suction side and the pressure side of a rotor blade profile, that is, in a direction perpendicular to the profile depth and perpendicular to the longitudinal axis. In the present invention, dimensions in this direction can be described as larger or smaller.

In addition, the expression "length" of the rotor blade is intended to describe the spacing between the rotor blade connection and the rotor blade tip in the direction of the longitudinal axis of the rotor blade.

The ratio of profile thickness to profile depth, the so-called "relative profile thickness", varies along the length of the rotor blade. The relative profile thickness is generally 100 percent at the rotor blade root and can be 10 percent at the rotor blade tip.

It should be pointed out that, when reference is made to the segmentation region, the connecting regions are included. The segmentation region does not necessarily include both connecting regions completely, this in particular being further explained below. Accordingly, the single curvature is present at least partially in the connecting regions of both rotor blade segments. In particular, when reference is made to the segmentation region, it is intended to convey the fact that regions of both rotor blade segments, that is, a region around the partition location, is meant.

According to one embodiment, an ascent slope of a pre-bending of the rotor blade is constant along the longitudinal axis in the segmentation region. In particular, in the segmentation region, the rotor blade has no or substantially (that is to say within the scope of manufacturing tolerances) no curvature as a result of a pre-bending. In other words, in the segmentation region, the rotor blade is not bent along the longitudinal axis in the direction of the pressure side. A central longitudinal axis runs linearly, that is, in a straight line, in this region.

According to one embodiment, a twist of the rotor blade is constant along the longitudinal axis in the segmentation region. In particular, there is no or substantially (that is, within the scope of manufacturing tolerances) no twisting of the rotor blade about the longitudinal axis.

According to one embodiment, a profile thickness of the rotor blade is constant along the longitudinal axis in the segmentation region. In other words, in this section, the profile thickness does not or substantially (that is, within the scope of manufacturing tolerances) does not vary.

According to one embodiment, a profile depth of the rotor blade remains constant along the longitudinal axis in the segmentation region. In other words, in this section, the profile depth does not or substantially (that is, within the scope of manufacturing tolerances) does not vary.

According to one embodiment, all the geometrical dimensions of the outer contour of the rotor blade remain constant in the segmentation region. This means that, over the entire segmentation region, identical rotor blade profiles are used for forming the aerodynamic envelope.

The above-described embodiments constitute preferred refinements of the invention that make possible, or achieve to a particular extent, the advantages and functions stated in the introduction.

According to one embodiment, a profile depth in the segmentation region is increased in comparison with a further profile depth in a region on a side facing toward the rotor blade hub, which region is adjacent to the segmentation region.

According to one embodiment, a profile thickness in the segmentation region is increased in comparison with a further profile thickness in a region of the rotor blade on a side facing toward the rotor blade hub, which region is adjacent to the segmentation region.

The adjacent region of the above-described refinements is in particular a region having no connection means, such as the bearing sleeves mentioned or the like. Consequently, the structural mechanics or design properties for the absorption of forces and moments at the partition location are improved. Preferably, thickening (profile thickness) and widening (profile depth) are realized to an equal extent. In this way, a particularly good compromise for the requirements for the structural mechanics and aerodynamics is achieved.

It is optionally conceivable for the extent of the widening and/or thickening to be reduced after the segmentation region, that is, on the side facing toward the blade tip.

In other words, the thickening and/or widening results in an enlarged profile and thus an enlarged rotor blade shell.

According to one embodiment, each of the two rotor blade segments has in the respective connecting region connection means for connection of the two rotor blade segments, wherein the segmentation region extends along the longitudinal axis at least over the connection means. That is, the segmentation region ends at the height of those cross sections of the rotor blade which are located at that end of the connection means of the first rotor blade segment which faces toward the blade root and at that end of the connection means of the second rotor blade segment which faces toward the blade tip.

Preferably, on both sides, the segmentation region extends slightly, for example up to 20 cm or 30 cm or 40 cm or 50 cm, beyond the above-described ends in the longitudinal direction.

According to one embodiment, each of the two rotor blade segments has in the respective connecting region connection means for connection of the two rotor blade segments, wherein the segmentation region extends perpendicularly to the longitudinal axis at least over the connection means. Typically, in the circumferential direction of the rotor blade, the connection means are distributed not over the entire circumference but only in each case in one specific section on the suction and pressure sides. The segmentation region thus extends over these sections at least in the circumferential direction. In other words, only a portion of the above-defined cross sections is covered by the segmentation section. Consequently, a particularly targeted and efficient optimization of the outer contour is described.

According to one embodiment, the connection means are bearing sleeves. In particular, they are threaded sleeves or so-called inserts having an internal thread.

The bearing sleeves are for example elements which are laminated into the connection ends of the blade segments. It is also conceivable that the two bearing sleeves are formed by partitioning a whole sleeve. In this case, the rotor blade is firstly manufactured in its entirety, that is, with a one-part envelope or shell, and is subsequently divided, for example cut or sawn, at a partition location. The division is realized in the region of the whole sleeves such that, for each whole sleeve, two sleeve halves are formed, one for each of the two blade segments formed by division. The sleeve halves correspond to the first or second bearing sleeves mentioned. The bearing sleeves typically have a passage bore or passage opening, wherein there is a partial change or variation of the cross section, contours, wall thickness or other features over the longitudinal axis of the sleeves.

That is, the sleeves have different sections over the length. The sleeves of both rotor blade segments are connected to one another via threaded bolt connections.

According to one embodiment, the connection means are arranged particularly close to the outer side of the rotor blade. In this way, an arrangement which is particularly favorable in terms of structural space is achieved. The spacing is, for example, dependent on selected insert and screw/threaded bolt sizes. For example, a spacing between screw (threaded bolt) longitudinal axis and rotor blade outer envelope is 50 mm in size.

According to one embodiment, proceeding from the partition location, the segmentation region, on both sides, extends in each case between 0.5 m and 1.5 m, for example over 1 m, along the longitudinal axis.

According to one embodiment, the partition location is arranged in the region from 15 to 40% or in the region from 60 to 90% of the length of the rotor blade, proceeding from a rotor blade hub. The first region is a region close to the rotor blade root, and the second region is a region close to the rotor blade tip. In the regions, by contrast to the blade central region (40 to 60%), the loads to be transferred in the region of the partition location, with respect to the structural space available, are particularly favorable for a partition. In the region close to the root, it would be possible for example for the aforementioned thickening and/or widening to be dispensed with, since the profile thickness present is sufficient.

According to a second aspect, a rotor blade segment for a partitioned rotor blade of a wind turbine is disclosed. The rotor blade segment has a first connection end with a first connecting region along the longitudinal axis, wherein the first connection end is associated with a second connection end of a further rotor blade segment for connection purposes, wherein the outer contour of the rotor blade is singly curved in the first connecting region.

The rotor blade permits the above-stated advantages and functions. Above-described embodiments—where applicable—apply analogously.

Further advantages, features and refinements emerge from the following embodiment, which is discussed in conjunction with the figures. Identical or similar elements or elements of identical action are denoted by the same reference signs in the figures. For reasons of clarity, it may be the case that not all the elements described are denoted by associated reference signs in all the figures.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
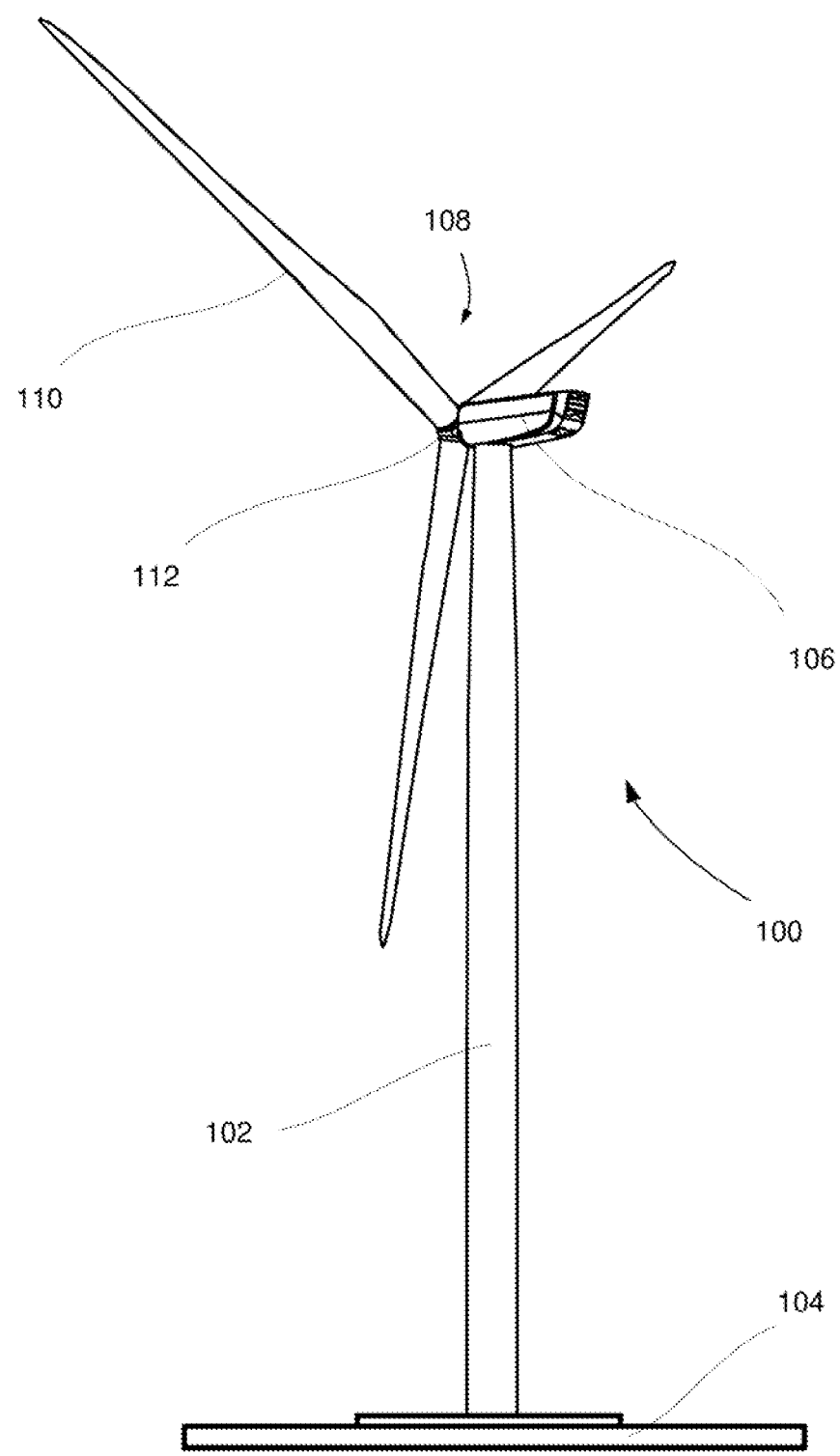
FIG. 1 shows a schematic illustration of a wind turbine.

FIG. 1 shows a schematic illustration of a wind turbine 100. The wind turbine 100 has a tower 102. The tower 102 is fixed on a base of a foundation 104. A nacelle 106 is mounted rotatably on an end of the tower 102 that is opposite the base. The nacelle 106 has for example a generator which is coupled to a rotor 108 via a rotor shaft (not shown). The rotor 108 has one or more rotor blades 110, which are arranged on a rotor hub 112.

During operation, the rotor 108 is set in rotation by a flow of air, for example wind. This rotational movement is transmitted via the rotor shaft and possibly a gear mechanism to the generator. The generator converts the kinetic energy of the rotor 108 into electrical energy.

Figure 2:
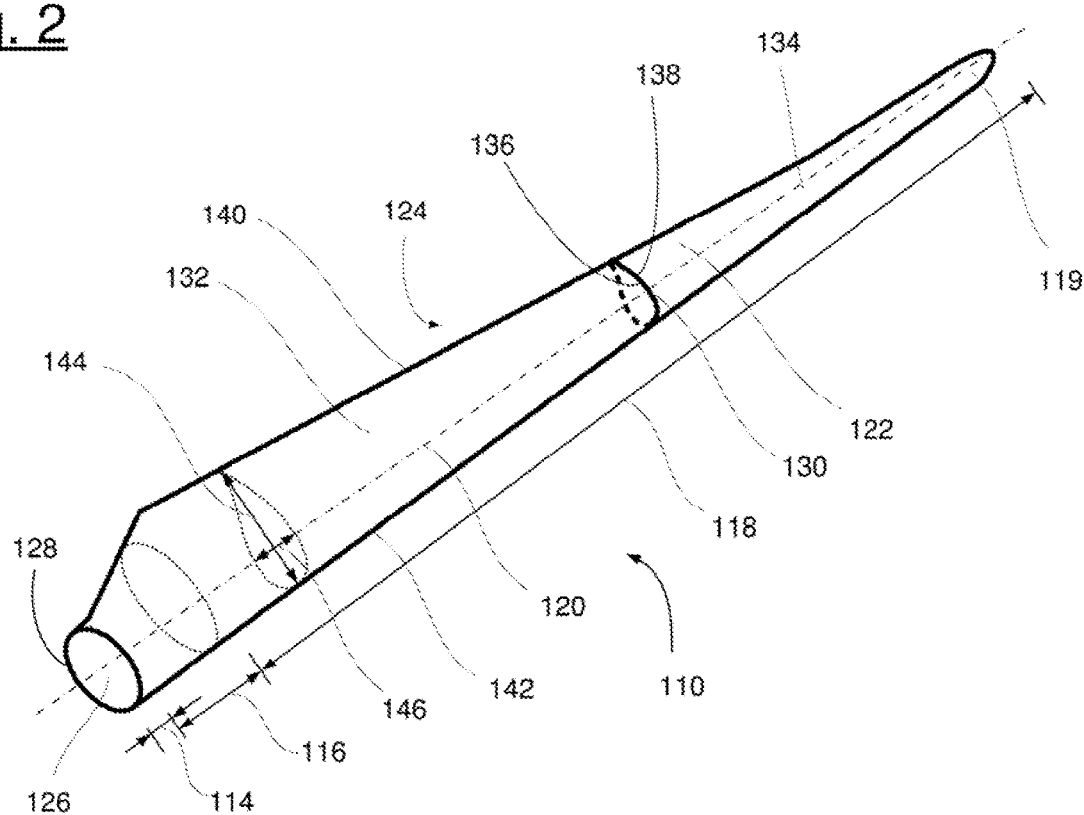
FIG. 2 shows a schematic perspective illustration of a partitioned rotor blade with two rotor blade segments.

FIG. 2 shows a wind turbine rotor blade 110. The rotor blade 110 has the shape of a conventional rotor blade and has a rotor blade root region 114 which faces toward the rotor hub 112. The rotor blade root region 114 typically has a substantially circular cross section. The rotor blade root region 114 is followed by a transition region 116 and a profile region 118 of the rotor blade 110. The rotor blade 110 has a blade tip 119. The rotor blade 110 has with respect to a direction of longitudinal extent 120 a pressure side 122 and an opposite suction side 124. The interior of the rotor blade 110 is of substantially hollow form.

In the rotor blade root region 114, there is provided a rotor blade connection end 126 with a flange connection 128, by means of which the rotor blade 110 is connected mechanically to a pitch bearing or an extender.

The rotor blade 110 has a partition location 130, at which a blade root-side rotor blade segment 132 and a blade tip-side rotor blade segment 134 are connected to one another. For this purpose, both segments 132, 134 each have a connection end 136, 138 (also referred to as rotor blade segment connection). The rotor blade 110 is thus a partitioned rotor blade as described in the introduction. On each connection end 136, 138, there is arranged a multiplicity of bearing sleeves (not illustrated), each of which has an internal thread for receiving threaded bolts (also referred to as bearing bolts or connecting bolts). A connection end 136, 138 is realized for example as a flange insert, which is inserted as an insert part into a manufacturing mold for producing the rotor blade 110. It is however also conceivable that no flange insert is provided and the bearing sleeves are embedded and laminated directly into the rotor blade half-shells. The bearing sleeves are for example steel sleeves.

The rotor blade 110 (and thus the segments 132, 134) has (have) a profile trailing edge 140 and a profile leading edge 142. A profile depth 144 is defined as a spacing from the profile trailing edge 140 to the profile leading edge 142 with respect to a profile cross section. A profile thickness 146 is defined as a spacing from the pressure side 122 to the suction side 124, wherein the maximum profile thickness of a profile cross section is intended to be meant in the present context. The profile thickness 146 is measured at right angles to the longitudinal axis 120 and to the profile depth 144. A (profile) cross section lies in a plane normal to the longitudinal axis 120.

The connection of both rotor blade segments 132, 134 is described in more detail below, an unpartitioned or hypothetically partitioned rotor blade being explained firstly.

Figure 3:
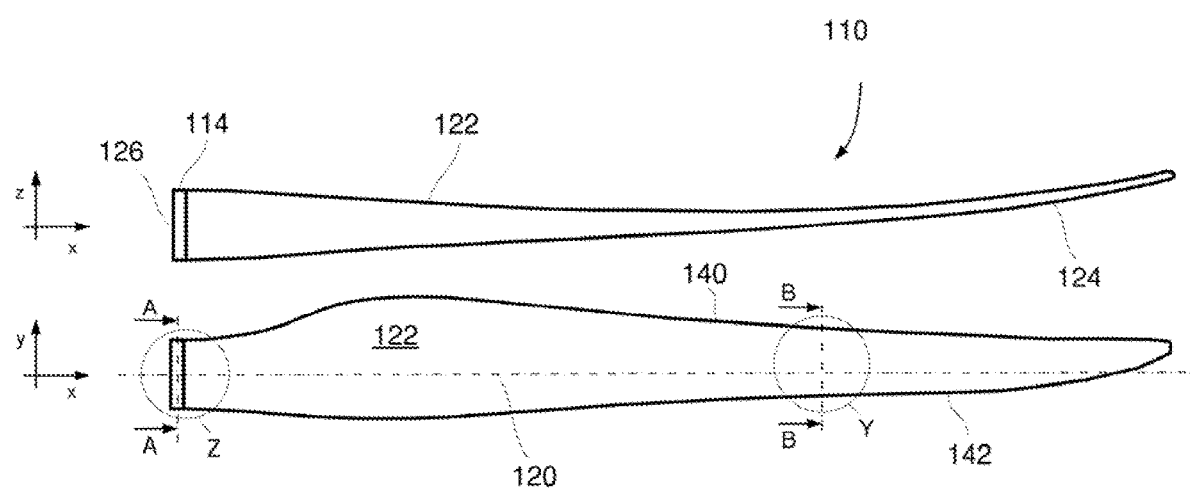
FIGS. 3 to 10 show views of an unpartitioned rotor blade according to the prior art.
Figure 4:
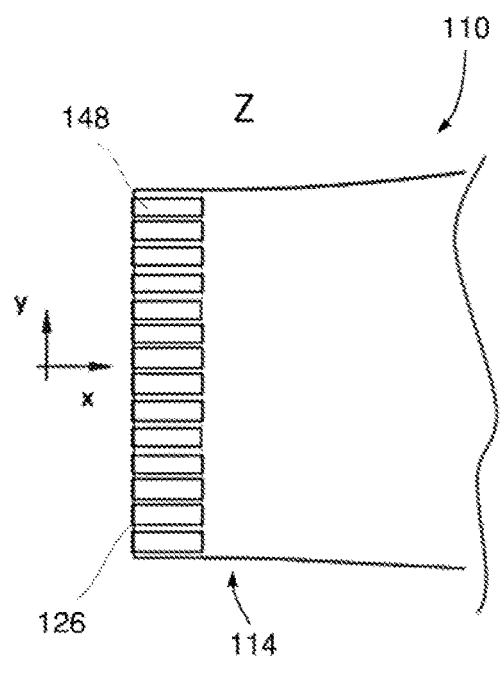

FIG. 3 shows two views of an unpartitioned rotor blade 110 according to the prior art with indicated coordinate systems. The upper illustration in FIG. 3 shows a view of the profile leading edge 142, and the lower illustration shows a view of the pressure side 122. The longitudinal axis 120 corresponds to the x direction of the indicated coordinate system. The lower view in FIG. 3 is rotated through 90° about the longitudinal axis or x-axis in relation to the upper view. FIGS. 4 to 7 show detail views Y and Z and sectional views according to the sections A-A and B-B of the rotor blade 110 according to FIG. 3.

Figure 5:
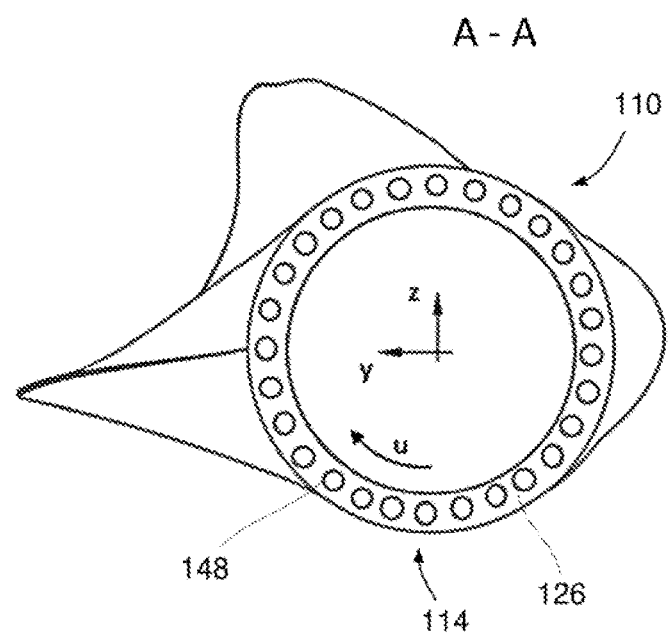
Figure 6:
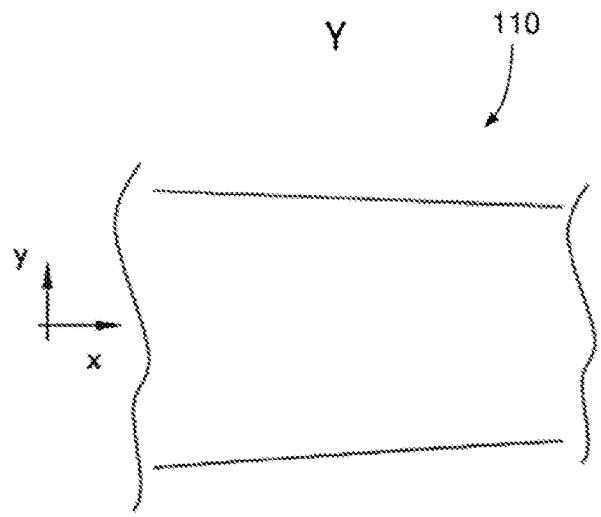
Figure 7:
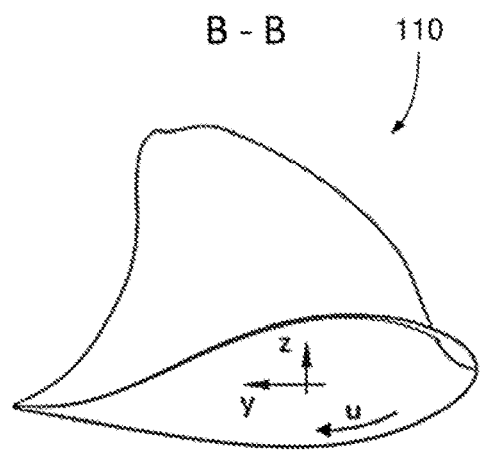

FIG. 3 schematically illustrates an aerodynamic envelope of the unpartitioned rotor blade. The singly curved blade connection or the rotor blade connection end 126 can be seen in detail Z (FIG. 4) and section A-A (FIG. 5). Owing to the circular blade connection at the blade root or at the blade root region 114 and the typically straight connection means (bearing sleeves 148 for bolt connections), this region has only a single, constant curvature, in the circumferential direction u, and no curvature in the blade longitudinal direction. A curvature with respect to the x direction is accordingly zero, while a curvature in the circumferential direction u is non-zero. An interface at the rotor hub 112 would typically be of identically circular form.

Detail Y (FIG. 6) and section B-B (FIG. 7) illustrate a region of the rotor blade in the direction of the blade tip, in which region a possible partition location L is situated. In the region of the possible partition location L, the aerodynamic envelope (rotor blade shell) has in all spatial directions a curvature which is not constant, in particular not equal to zero. A curvature with respect to the x direction and a curvature in the circumferential direction u are in each case non-zero. Moreover, the rotor blade 110 is twisted about the longitudinal axis or x-axis.

Figure 8:
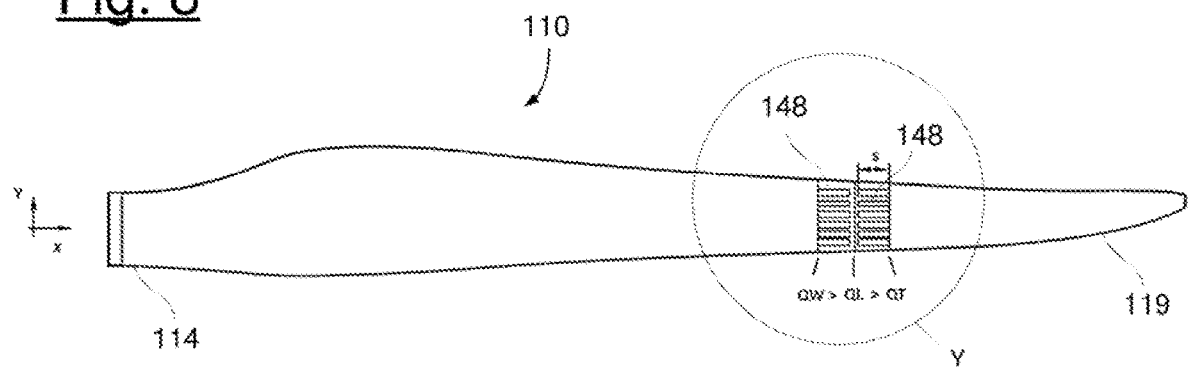
Figure 9:
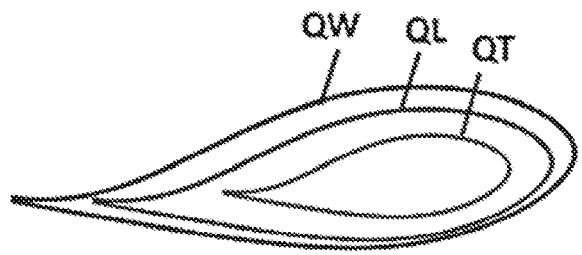

Owing to a defined length s of the bearing sleeves 148 (and of the longitudinal bolts), embedding of bearing sleeves 148 at this partition location L would not be optimal. This is made clear in FIGS. 8 to 10. Here, FIG. 8 shows the view of the pressure side 122 according to FIG. 3, wherein the rotor blade 110 is illustrated broken open in the region of the partition location L. In the region of the partition location L, in which the bearing sleeves 148 are arranged, the rotor blade 110 has differing profile cross sections of the outer contour or shell, of which, by way of example, three profile cross sections QW, QL, QT have been selected and are illustrated in FIG. 9 on an enlarged scale and in a superimposed manner. The first cross section QW is a cross section in the rotor blade root-side rotor blade segment that has a certain spacing to the partition location L. The second cross section QL is the cross section at the partition location L. The third cross section QT is a cross section in the rotor blade tip-side rotor blade segment that has a certain spacing to the partition location L in the direction of the rotor blade tip 119.

Figure 10:
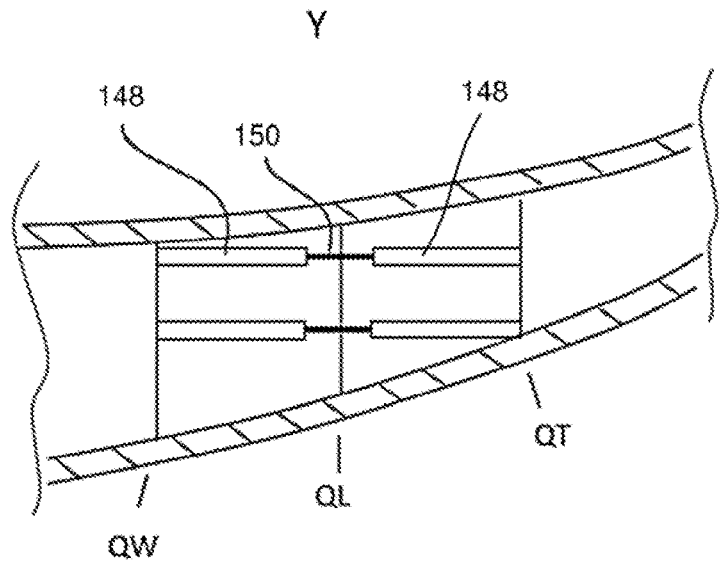

For the introduction into the rotor blade 110 of the bearing sleeves 148, which are connected in pairs by bolts 150, it would be possible to utilize only the structural space in the smallest, that is, rotor blade tip-side, cross section QT, instead of the rotor blade root-side cross section QW, the latter being more favorable in terms of structural mechanics (see FIG. 10). This is because such a mechanical connection requires an identical number and an identical orientation of the bolts 150 and sleeves 148 in the two rotor blade segments. The cross section QT, which is least favorable in terms of structural space and is situated furthest toward the rotor blade tip, would thus define in the region of the partition location L the number of bearing sleeves 148 and the orientation thereof. In terms of structural mechanics and design, this would be a highly unfavorable scenario.

Also, owing to the pre-bending of the rotor blade, a partition parallel to the blade flange, as is normally favored in the root region, would, in terms of optimized utilization of structural space, be highly wasteful.

In the following embodiments of the invention, provision is made for the rotor blade 110 to be partitioned at an angle which is optimal in terms of structural space, and for the rotor blade 110 or the rotor blade segments 132, 134 to be configured in such a way that an outer contour 152 of the rotor blade 110 is singly curved. In consideration of the main dimensions of a segmented rotor blade, such as partitioning length, partitioning angle, sectional shape, length of bolt pairing and number of bearing sleeves (also inserts), it is thereby possible for a doubly curved rotor blade contour to be transferred to a singly curved region which is optimized in terms of structural mechanics and design.

Figure 11:
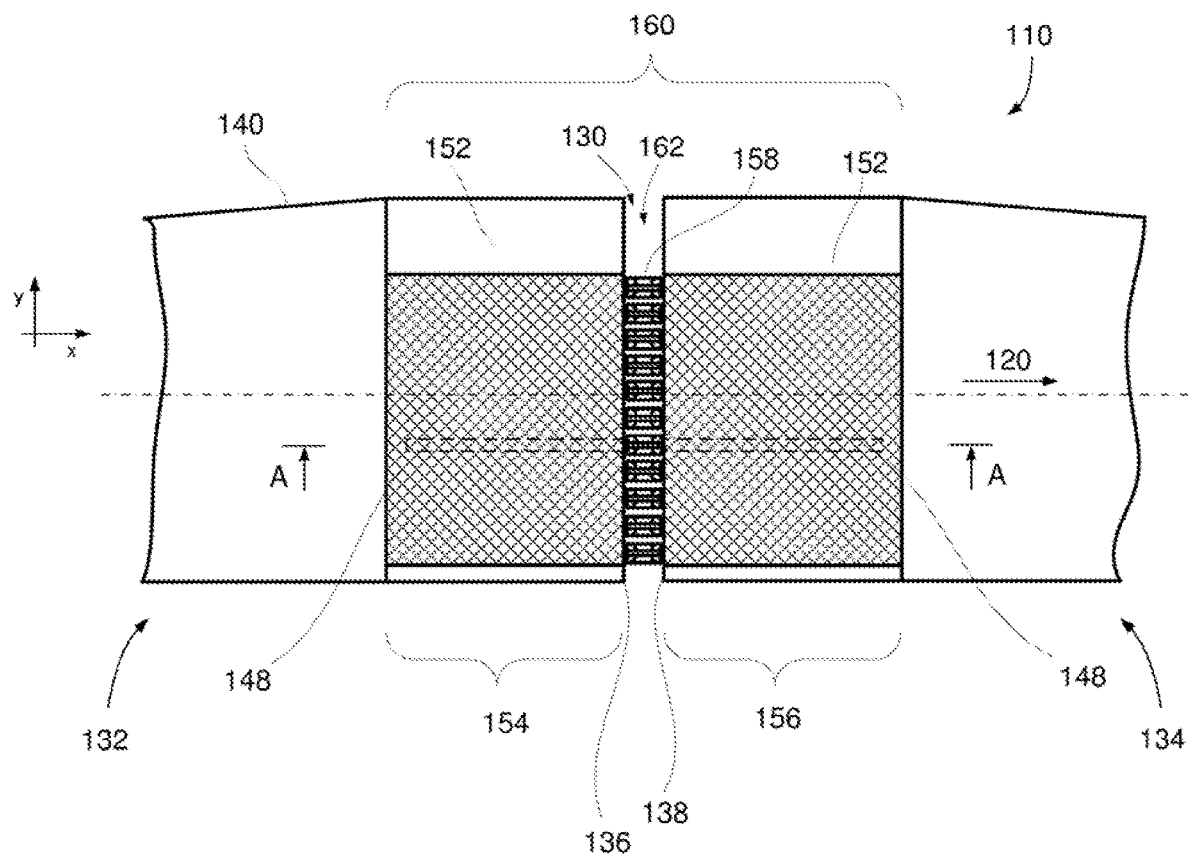
FIG. 11 shows a schematic detail view of a partitioned rotor blade according to an embodiment of the invention.

FIG. 11 shows an embodiment of the invention, wherein the rotor blade 110 is illustrated in the region of the partition location 130. The first rotor blade segment 132 has the first connection end 136 with a first connecting region 154. The first connecting region 154 extends along the longitudinal axis 120 at least over the bearing sleeves 148 embedded in the first connection end 136 (a bearing sleeve pair being schematically indicated in FIG. 11). Analogously, the second rotor blade segment 134 has the second connection end 138 with a second connecting region 156. The second connection end 138 and the second connecting region 156 are associated with the first connection end 136 and the first connecting region 154, respectively. The two connecting regions 154, 156 are connected at the partition location 130 of the rotor blade 110 via bolt connections 158 (comprising sleeves and bolts) and form a common segmentation region 160. The segmentation region 160 extends along the longitudinal axis 120 or the x direction at least over the bolt connections 158, that is, the bolts 150 and bearing sleeves 148 used. Transversely to the longitudinal axis, that is, in the y direction, the segmentation region 160 at least likewise covers the bolt connections 158. As can be seen in FIG. 11, the bolt connections 158 are not arranged over the entire profile depth in the y direction (or circumferential direction).

In this segmentation region 160 of the rotor blade 110, the common outer contour 152 of the rotor blade 110, which common outer contour is formed by the connection of both rotor blade segments 132, 134 and is interrupted only by a small gap 162, is singly curved.

In the case of the embodiment according to FIG. 11, the profile thickness and the profile depth remain constant in the segmentation region. An ascent slope of the pre-bending of the rotor blade 110 is constant along the longitudinal axis (x direction) in the segmentation region 160, that is, the pre-bending is "frozen" and the rotor blade has no curvature in the x direction. In the segmentation region 160, it is furthermore provided that the twist of the cross-sectional profiles is not changed over the length of the segmentation region 160. In other words, the rotor blade 110 is linearized in this region with respect to the parameters mentioned.

In the segmentation region 160, the rotor blade 110 consequently has a singly curved outer contour 152 over both segments 132, 134.

In order to increase the number of implementable inserts or bearing sleeves 148, the profile thickness of the cross-sectional profiles can be increased in the segmentation region 160. This preferably occurs in an aerodynamically scaled manner, so that, in addition to the profile thickness, the profile depth is also similarly enlarged.

Figure 12:
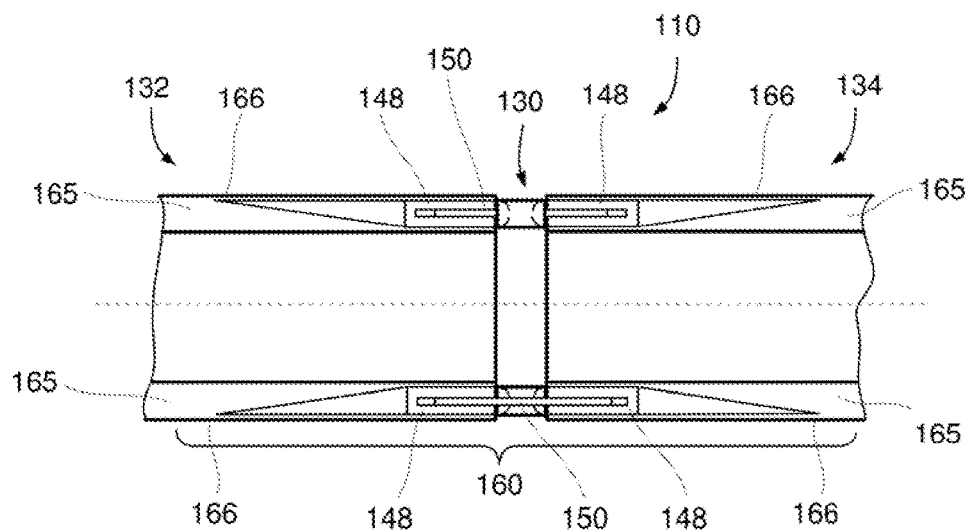
FIG. 12 shows a schematic longitudinal sectional view of the rotor blade according to FIG. 11.

FIG. 12 illustrates a longitudinal section of the rotor blade 110 according to FIG. 11. The bearing sleeves 148 are arranged particularly close to the outer side 166 of the rotor blade segments 132, 134 in the rotor blade shell 165. This means that the bolt pairings bear directly against the blade envelope and, consequently, the structural space is optimally utilized. This optionally also applies analogously to the embodiments already described.

Figure 13:
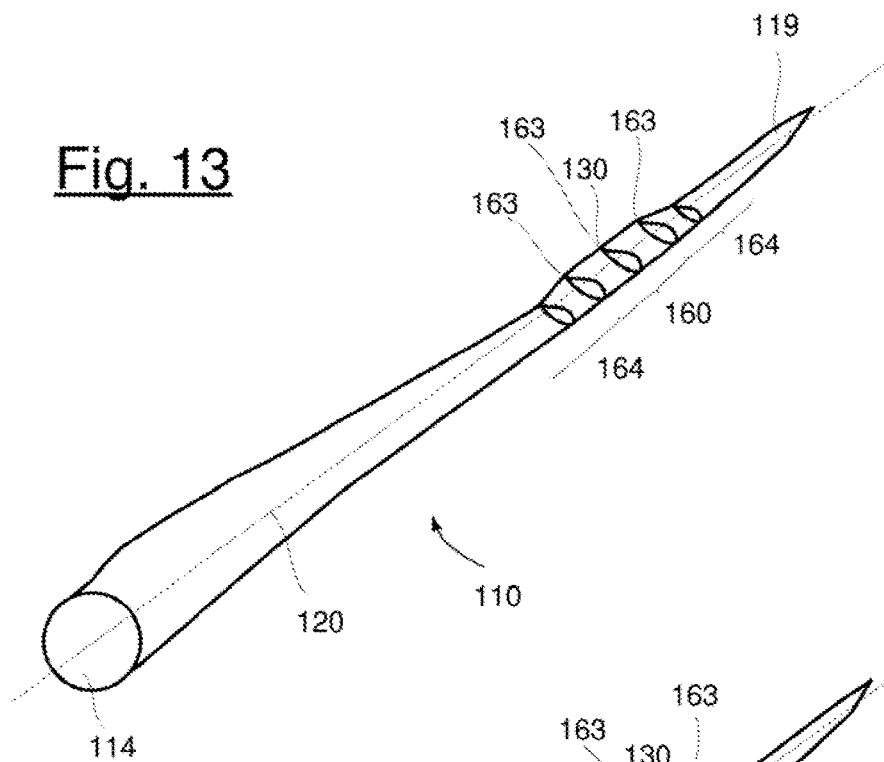
FIG. 13 shows a schematic perspective view of a partitioned rotor blade according to an embodiment of the invention.
Figure 14:
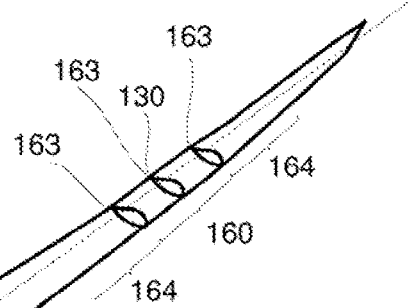
FIG. 14 shows a schematic perspective view of a partitioned rotor blade according to a further embodiment of the invention.

FIGS. 13 and 14 show embodiments of a rotor blade 110 having such a rotor blade outer contour 152 and, as a result, an optimized segmentation region 160. In both embodiments, the outer contour of the segmentation region has a single curvature. It can be seen that all the profile cross sections 163 in the segmentation region 160 have the same profile thickness and profile depth. In the segmentation region 160, the rotor blade 110 has a constant ascent slope for the pre-bending and no twist. In FIG. 13, the profile thickness and the profile depth are significantly increased in the segmentation region 160 in comparison with regions 164 along the longitudinal axis 120 that, from the blade root region 114 in the direction of the blade tip 119, are directly adjacently before and after the segmentation region 160. As a result of the thickening, the loads to be borne are reduced (cf. Steiner's theorem). In FIG. 14, all the profile cross sections 163 in the segmentation region 160 likewise have the same profile thickness and profile depth. In this case, the profile thickness 146 and the profile depth 144 correspond to the profile of the segmentation region that is arranged furthest in the direction of the rotor blade root 114, that is, the segmentation region is not thickened.

Figure 15:
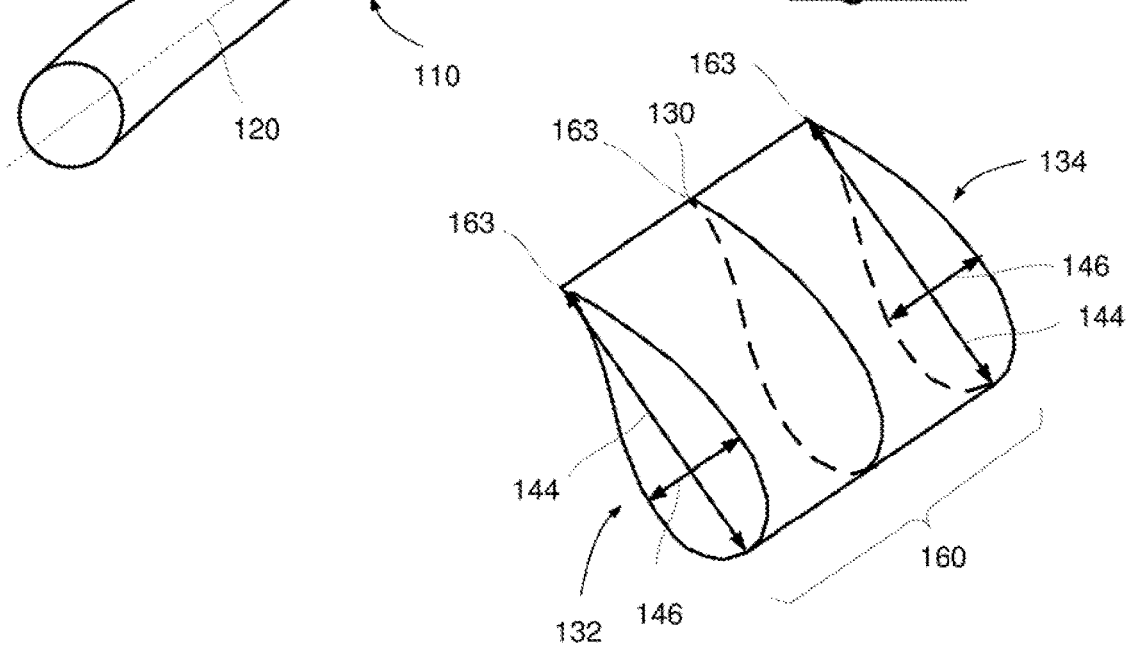
FIG. 15 shows a schematic perspective view of a cross section of a partitioned rotor blade according to FIGS. 13 and 14.

FIG. 15 shows the segmentation region 160 of the rotor blades from FIGS. 13 and 14. The rotor blade thickness 146 and the rotor blade depth 144 are constant, and the segmentation region has a constant ascent slope for the pre-bending and no twist.

Figure 16:
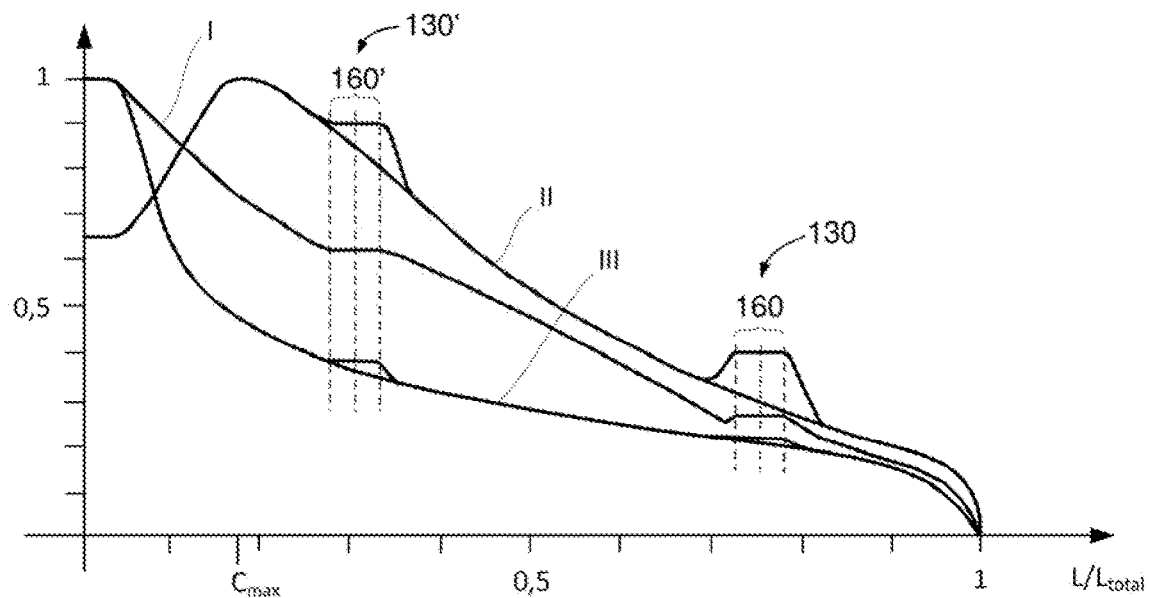
FIG. 16 shows a schematic diagrammatic illustration with three graphs of a rotor blade according to embodiments of the invention; and, FIGS. 17 and 18 shows two schematic diagrammatic illustrations for determining a partition location of a rotor blade according to an embodiment of the invention.

FIG. 16 shows a schematic diagrammatic illustration, with three curves I, II and III being illustrated. Graph I relates to the distribution of the profile thickness, graph II relates to the distribution of the profile depth, and graph III relates to the distribution of the relative profile thickness, in each case over the length of a rotor blade, wherein two possible partition locations 130 and 130' and corresponding segmentation regions 160 and 160', respectively, are illustrated. It can be seen that, at the partition location 130' close to the root, the rotor blade profile is not thickened. The profile thickness 146 remains constant in the segmentation region. Since the profile depth is likewise constant, the relative profile thickness also remains constant in the segmentation region 160'. At the possible partition location 130 close to the tip, the rotor blade profile is thickened. The profile thickness is increased and is constant over the segmentation region 160. The same applies to the profile depth. The relative profile thickness remains constant. It goes without saying that such a thickening may be provided at both or neither of the partition locations. Furthermore, it can be seen from the graph II in FIG. 16 that the partition locations 130, 130' are situated behind a rotor blade position with a maximum profile depth $C_{max}$.

It should be mentioned at this juncture that a rotor blade according to one of the embodiments described may also have two or more partition locations.

Figure 17:
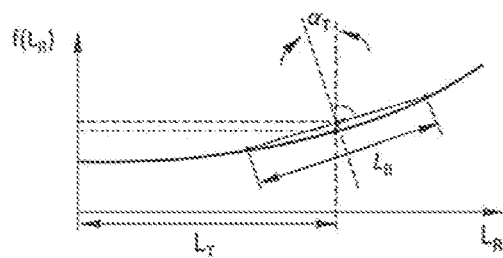
Figure 18:
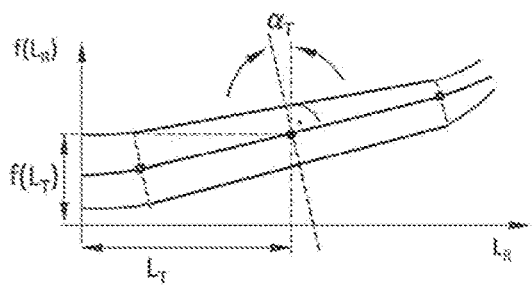

For determining an optimal partition location, reference should be made to FIGS. 17 and 18, which illustrate two diagrammatic illustrations.

FIG. 17 shows the rotor blade 110 in simplified form according to its pre-bending $f(L_R)$, where $L_R$ denotes the rotor blade length, $L_T$ denotes the partitioning position and $f(L_R)$ denotes the height of the pre-bending. Then the length $L_B$ of the bolt pairing is therefore known and is fitted at its end points on this pre-bending line such that the center point of the bolt pairing length is situated exactly on the section line $L_T$, in order to ensure the exact splitting length. The splitting angle $\alpha_T$ is then characterized by the perpendicular to the bolt pairing length, measured in relation to the vertical at the partitioning position $L_T$. The partitioning angle $\alpha_T$ is then normally at ±2° in relation to the angle which would result for a partitioning perpendicular to the pre-bending.

Furthermore, the rotor blade outer contour 152 can then also be indicated in this diagram and thus matched to the pre-bending, the latter then being straight or constant in the partitioning region. FIG. 18 qualitatively shows a pre-bending of a segmented rotor blade 110 in the longitudinal direction, which pre-bending is optimized in terms of structural space. The main dimension $\alpha_T$ has then been determined and corresponds to an optimized sectional shape in the segmentation region 160. The main dimension $\alpha_T$ significantly determines the structural space for the bolt pairings to be implemented.

It is understood that the foregoing description is that of the preferred embodiments of the invention and that various changes and modifications may be made thereto without departing from the spirit and scope of the invention as defined in the appended claims.

LIST OF REFERENCE SIGNS

100 Wind turbine
102 Tower
104 Foundation
106 Nacelle
108 Rotor
110 Rotor blade
112 Rotor hub
114 Rotor blade root region
116 Transition region
118 Profile region
119 Blade tip
120 Direction of longitudinal extent
122 Pressure side
124 Suction side
126 Rotor blade connection end
128 Flange connection
130 Partition location
130' Partition location
132 First rotor blade segment
134 Second rotor blade segment
136 First connection end
138 Second connection end
140 Profile trailing edge
142 Profile leading edge
144 Profile depth
146 Profile thickness
148 Bearing sleeve
150 Bolt
152 Outer contour
154 First connecting region
156 Second connecting region
158 Bolt connection
160 Segmentation region
160' Segmentation region
162 Gap
163 Profile cross section
164 Region
165 Rotor blade shell
166 Outer side
A-A Section
B-B Section
I First graph
II Second graph
III Third graph
L Possible partition location
s Length of a bearing sleeve
u Circumference
Y Detail view
Z Detail view

What is claimed is:

1. A partitioned rotor blade for a wind energy system, the partitioned rotor blade defining a longitudinal axis and comprising:
at least a first rotor blade segment and a second rotor blade segment along said longitudinal axis;
said first rotor blade segment having a first connecting region terminating in a first connecting end and said second rotor blade segment having a second connecting region terminating in a second connecting end;
said first and second connecting ends conjointly defining a partition interface transverse to said longitudinal axis;
a connecting assembly mutually connecting said first and second connecting regions at said partition interface to define a common segmentation region;
said rotor blade having a common outer contour of single curvature in said segmentation region formed by the connection of said first and second rotor blade segments;
said common outer contour being singly curved in said segmentation region to define only one curvature transverse to said longitudinal axis;
said partitioned rotor blade having a profile thickness and a profile depth which are constant in said segmentation region;
wherein said connecting assembly includes connecting devices in each of said first and second connecting regions to mutually connect said first and second rotor blade segments; and,
said segmentation region extends at least over said connecting devices along said longitudinal axis.

2. The partitioned rotor blade of claim 1, wherein said first and second connecting regions are arranged along said longitudinal axis.

3. The partitioned rotor blade of claim 1, wherein a slope of a pre-bending of said rotor blade is constant in said segmentation region along said longitudinal axis.

4. The partitioned rotor blade of claim 1, wherein said rotor blade has a constant twist in said segmentation region along said longitudinal axis.

5. The partitioned rotor blade of claim 1, wherein all geometric measurements of said outer contour of said rotor blade are constant in said segmentation region.

6. The partitioned rotor blade of claim 1, wherein said wind energy system includes a hub; and, said segmentation region has an end facing toward said hub; said rotor blade has a border region bordering on said end of said segmentation region; and, said rotor blade further comprises a first profile depth in said segmentation region and a second profile depth in said border region; and, said first profile depth is greater than said second profile depth.

7. The partitioned rotor blade of claim 1, said wind energy system includes a hub; and, said segmentation region has an end facing toward said hub; said rotor blade has a border region bordering on said end of said segmentation region; and, said rotor blade further comprises a first profile thickness in said segmentation region and a second profile thickness in said border region; and, said first profile thickness is greater than said second profile thickness.

8. The partitioned rotor blade of claim 1, wherein said connecting devices are bearing sleeves.

9. The partitioned rotor blade of claim 1, wherein said connecting assembly includes connecting devices in each of said first and second connecting regions for mutually connecting said first and second rotor blade segments; and, said segmentation region extends transversely to said longitudinal axis at least over said connecting devices in each of said first and second connecting regions.

10. The partitioned rotor blade of claim 9, wherein the connecting devices are bearing sleeves.

11. The partitioned rotor blade of claim 1, wherein said segmentation region extends from said partition interface to both sides thereof along said longitudinal axis by more than one meter in each direction along said longitudinal axis.

12. The partitioned rotor blade of claim 1, wherein said rotor blade has a length extending from a mounting end to a rotor blade tip; and, said partition interface is located in a range of 15 to 40% of the length of said rotor blade measured from said mounting end.

13. The partitioned rotor blade of claim 1, wherein said rotor blade has a length extending from a mounting end to a rotor blade tip; and, said partition interface is located in a range of 60 to 90% of the length of said rotor blade measured from said mounting end.

14. A rotor blade segment for a partitioned rotor blade of a wind turbine, the rotor blade segment comprising:
- a first connection end with a first connecting region along a longitudinal axis; the first connection end being associated with a second connection end of a further rotor blade segment for connection purposes;
- the outer contour of the rotor blade being singly curved in the first connecting region to define only one curvature transverse to said longitudinal axis; and,
- said first connecting region having a profile thickness and a profile depth which are constant in said first connecting region.

15. A partitioned rotor blade for a wind energy system, the partitioned rotor blade defining a longitudinal axis and comprising:
- at least a first rotor blade segment and a second rotor blade segment along said longitudinal axis;
- said first rotor blade segment having a first connecting region terminating in a first connecting end and said second rotor blade segment having a second connecting region terminating in a second connecting end;
- said first and second connecting ends conjointly defining a partition interface transverse to said longitudinal axis;
- a connecting assembly mutually connecting said first and second connecting regions at said partition interface to define a common segmentation region;
- said rotor blade having an outer contour being doubly curved;
- said rotor blade having a pre-bending along said longitudinal axis;
- said rotor blade having a common outer contour in said segmentation region formed by the connection of said first and second rotor blade segments;
- said outer contour being singly curved in said segmentation region to define only one curvature transverse to said longitudinal axis;
- said partitioned rotor blade having a profile thickness and a profile depth which are constant in said segmentation region;
- a slope of said pre-bending of said rotor blade being constant in said segmentation region along said longitudinal axis; and,
- wherein said connecting assembly includes connecting devices in each of said first and second connecting regions to mutually connect said first and second rotor blade segments; and, said segmentation region extends at least over said connecting devices along said longitudinal axis.

16. A partitioned rotor blade for a wind energy system, the partitioned rotor blade defining a longitudinal axis and comprising:
- at least a first rotor blade segment and a second rotor blade segment along said longitudinal axis;
- said first rotor blade segment having a first connecting region terminating in a first connecting end and said second rotor blade segment having a second connecting region terminating in a second connecting end;
- said first and second connecting ends conjointly defining a partition interface transverse to said longitudinal axis;
- a connecting assembly mutually connecting said first and second connecting regions at said partition interface to define a common segmentation region;
- said rotor blade having an outer contour being doubly curved;
- said rotor blade having a first aerodynamic profile and a second aerodynamic profile, wherein said first aerodynamic profile is twisted in relation to said second aerodynamic profile along the longitudinal axis;
- said rotor blade having a common outer contour in said segmentation region formed by the connection of said first and second rotor blade segments;
- said outer contour being singly curved in said segmentation region to define only one curvature transverse to said longitudinal axis;
- said partitioned rotor blade having a profile thickness and a profile depth which are constant in said segmentation region;
- said rotor blade having a constant twist in said segmentation region along said longitudinal axis;
- wherein said connecting assembly includes connecting devices in each of said first and second connecting regions to mutually connect said first and second rotor blade segments; and,
- said segmentation region extends at least over said connecting devices along said longitudinal axis.

17. A partitioned rotor blade for a wind energy system, the partitioned rotor blade defining a longitudinal axis and comprising:
- at least a first rotor blade segment and a second rotor blade segment along said longitudinal axis;
- said first rotor blade segment having a first connecting region terminating in a first connecting end and said second rotor blade segment having a second connecting region terminating in a second connecting end;
- said first and second connecting ends conjointly defining a partition interface transverse to said longitudinal axis;
- a connecting assembly mutually connecting said first and second connecting regions at said partition interface to define a common segmentation region;
- said rotor blade having an outer contour being doubly curved;
- said rotor blade having a pre-bending along said longitudinal axis and said rotor blade having a first aerodynamic profile and a second aerodynamic profile, wherein said first aerodynamic profile is twisted in relation to said second aerodynamic profile along said longitudinal axis;
- said rotor blade having a common outer contour in said segmentation region formed by the connection of said first and second rotor blade segments;

said outer contour being singly curved in said segmentation region to define only one curvature transverse to said longitudinal axis;

said partitioned rotor blade having a profile thickness and a profile depth which are constant in said segmentation region;

a slope of a pre-bending of said rotor blade being constant in said segmentation region along said longitudinal axis; and, said rotor blade having a constant twist in said segmentation region along said longitudinal axis;

wherein said connecting assembly includes connecting devices in each of said first and second connecting regions to mutually connect said first and second rotor blade segments; and, said segmentation region extends at least over said connecting devices along said longitudinal axis.

* * * * *